United States Patent
De Vries

(10) Patent No.: US 6,928,428 B1
(45) Date of Patent: Aug. 9, 2005

(54) DISTRIBUTED CONFIDENTIAL CONTEXTUAL QUERYING

(75) Inventor: Jean Pierre De Vries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 09/723,408

(22) Filed: Nov. 27, 2000

(51) Int. Cl.⁷ .............................................. G06F 17/30
(52) U.S. Cl. ........................................ 707/3; 707/102
(58) Field of Search .................... 707/1–10, 100–104.1, 707/200–205

(56) References Cited

U.S. PATENT DOCUMENTS

| | | | | |
|---|---|---|---|---|
| 5,548,755 A | * | 8/1996 | Leung et al. ................... | 707/2 |
| 6,263,328 B1 | * | 7/2001 | Coden et al. ................... | 707/3 |
| 6,505,191 B1 | * | 1/2003 | Baclawski ...................... | 707/3 |
| 6,546,388 B1 | * | 4/2003 | Edlund et al. .................. | 707/5 |

OTHER PUBLICATIONS

Hoover and Kausik, *Software Smart Cards via Cryptographic Camouflage*, Proceedings of the 1999 IEEE Symposium on Security and Privacy, IEEE (1999) pp. 208–215.

* cited by examiner

*Primary Examiner*—Mohammad Ali
(74) *Attorney, Agent, or Firm*—Klarquist Sparkman LLP

(57) ABSTRACT

For distributed querying of confidential information, a querying data structure is constructed from the confidential information on the computer at which the confidential information resides. The querying data structure opaquely encapsulates queries on the confidential information as a set of query hashes and answer pairs. The querying data structure is distributed to other computers where the distributed query processing is to be performed. The query is performed on such other computers by hashing the query terms, using the resulting query hash as a look up index to the associated answer in the querying data structure, and acting on the answer. A strictly one-way hash is used to prevent recovery of the original inputs to the query hashes in the query data structure by reverse hash.

16 Claims, 6 Drawing Sheets

DISTRIBUTED CONFIDENTIAL CONTEXTUAL QUERYING

TECHNICAL FIELD

This invention relates to communications and messaging systems to provide distributed querying based on confidential data, such as may be useful for contextual information services on distributed communications networks.

BACKGROUND

Currently, the telecommunications industry is rapidly deploying and developing distributed communications networks to provide data communications to personal mobile computing and communications devices, such as to cell phones, pagers, hand-held and laptop computers, wearable computers, vehicle-based computers, and so on. These distributed communications networks provide a communications medium over which information service providers can deliver individually personalized or customized information, such as stock quotes, sports scores, news articles, etc., via data/text, voice and/or video messages (e.g., email, instant messaging, voice messaging, etc.) to the users' personal mobile devices.

In the near future, it will be desirable for the information service providers (and advantageous to the users) to provide information services that further deliver contextually relevant information to individual users. In other words, the services provide information relevant to the user's current context (e.g., location, activity, setting, social/business relationships, etc., as well as personal preferences). For example, a contextual information service may deliver a notification that a social acquaintance is physically nearby when the user is off-work in a public place, or that a business contact is scheduled to attend a same event as the user, among many others. As another example, a contextual information service may deliver a weather or news report localized for the user's present geographical location, or in anticipation of the ski or golf outing on the user's calendar.

When such contextual information services are operated on a large-scale (herein termed a "context megaservice"), the information service likely will require processing queries on large collections of sensitive personal information (e.g., location, preferences, circle of friends, etc.). Further, for purposes of scaling performance to a large scale operation, this processing may be distributed across many server computers, including on servers operated by various different entities (e.g., other information providers).

For many people, such large-scale distributed processing of personal information raises privacy concerns. Many people therefore will be reluctant to disclose personal data to anybody other than (at most) a few trusted entities. Such concerns may limit the adoption and scale of context megaservices, despite their potential utility to the users.

BRIEF SUMMARY

The present invention is directed towards ways to distribute processing based on confidential information without making the confidential information available to untrusted information processing servers in an intelligible form (i.e., plain text). The present invention opaquely encapsulates the confidential information into a form of a "software black box" on a trusted computer (e.g., the user's computer, or a trusted server) where the raw confidential information resides. This black box encapsulates the confidential information in a manner from which the confidential information cannot be explicitly derived, but answers queries on the confidential information. The black box can be distributed or published to other computers, where the black box can be used to answer queries without revealing the confidential information.

In one embodiment of the invention illustrated herein, the black box takes the form of a set of query, answer pairs, where the query hash is represented as a hash result that is a one-way hashing function of a set of query input values. This set of query, answer pairs is distributed to other computers which can then effectively query the confidential information without having access to or directly processing the raw confidential information. Instead, a query comprising a set of the query input values is hashed using the same one-way hashing function. The hash result of the query is used as a look-up into the set of query, answer pairs to obtain the appropriate answer to the query.

This form of black box encapsulation of confidential information queries protects the confidential information from discovery on the computers to which it is distributed in at least two ways. First, due to the one-way hashing function, the initial set of input values from which each individual query, answer pair in the query, answer pair set cannot be directly re-constructed from the query value of the pair. More significantly, however, the logic or reasoning and possibly other confidential data values (in addition to the query input values) that determine the answer for the set of query input values is not visible from the query, answer pairs set, even if it were possible to reverse-hash the query hash results in each pair to their initial query input values.

Additional features and advantages will be made apparent from the following detailed description of the illustrated embodiment which proceeds with reference to the accompanying drawings.

DETAILED DESCRIPTION

In the following detailed description, one implementation of distributed confidential querying in accordance with the invention is embodied in a user-contextual information service that provides notifications to a user based on the user's context (e.g., location, activity, setting, social/business relationships, personal preferences, etc.). Although described with reference to a contextual information service, the distributed confidential querying of the invention can be applied in other applications involving distributed data processing based upon confidential data, which data is not explicitly distributed.

Figure 1:
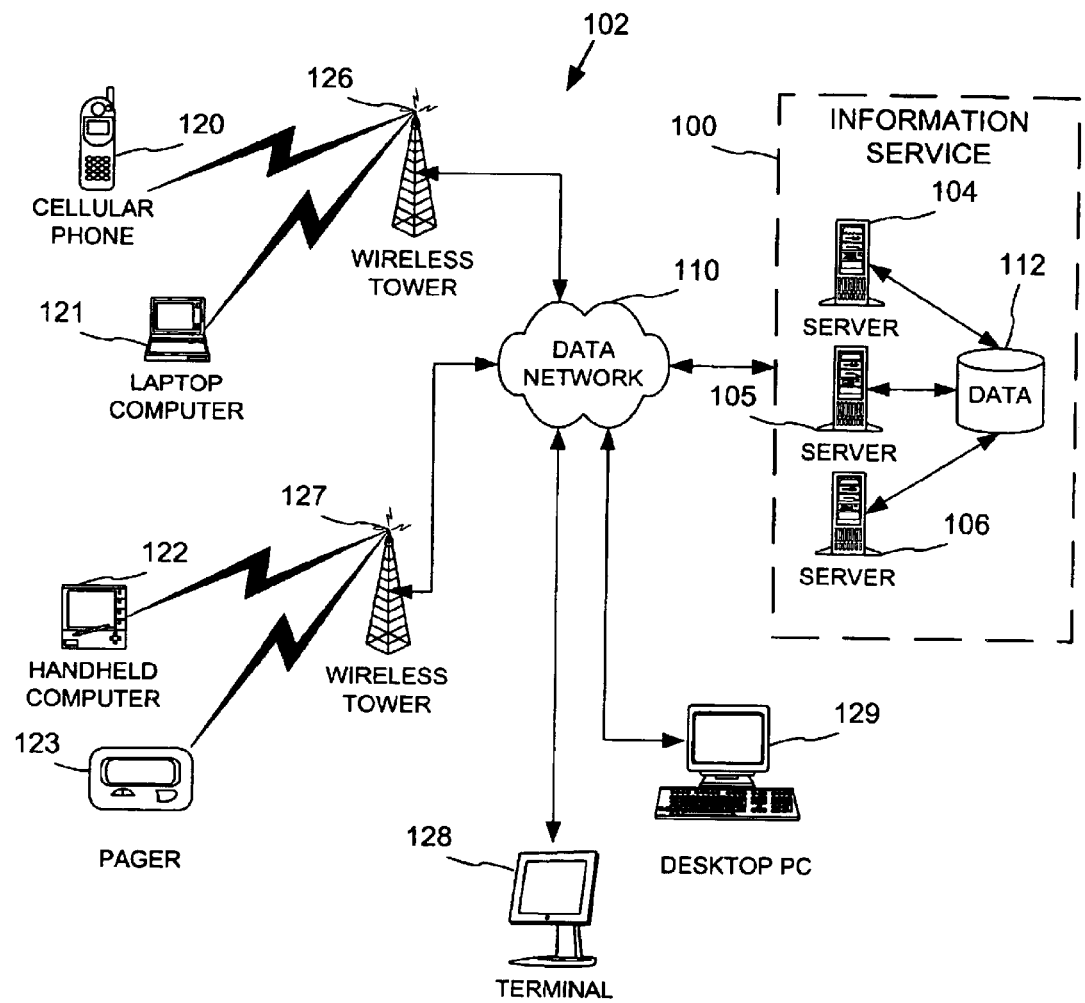
FIG. 1 is a block diagram depicting a communications system in which a contextual information service according to one embodiment of the invention operates.

With reference to FIG. 1, the user-contextual information service 100 of an illustrated embodiment of the invention operates in a distributed computing/communications environment 102 in which a server computer or group of servers 104–106 connect with and communicate information to mobile personal networked computing or telecommunications devices 120–123 and/or stationary devices 128–129 via a distributed data communications network 110. The information service 100 queries service-provided data available in a server-side database(s) 112 for relevancy to a user's context in order to deliver information appropriate to the context (hereafter "contextually-related information") over the distributed data communications network to the respective device 120–123 operated by the user. The information service 100 may be operated solely by one provider or cooperatively with other third party entities.

Users of the information service 100 access the information service from the mobile personal networked computing or telecommunications devices 120–123, such as cell phones, pagers, personal digital assistants, handheld and laptop computers, electronic books or tablets, smart cards, electronic badges, and etc. Preferably, these mobile devices communicate with the information service on the data communications network 110 through a wireless networking and communications system (e.g., including wireless transmission/reception towers 126–127). The mobile devices 120–123 and information service can use standard data networking protocols for data communications on the network 110, such as TCP/IP, HTML, XML, HTTP, DNS, LDAP, and/or others. Alternatively, the data communications network also can encompass data communications technologies that may not provide constant or mobile wireless connections. In one alternative, the data communications network can use a short-range wireless technology, such as Bluetooth (which provides a point-to-point connection), for communicating the information delivered from the information service. In another alternative, the user may intermittently connect on the data communications network and information service, such as use of a smartcard on a web kiosk 129 to access and receive contextual information from the information service, where the user would only be connected and networked with the information service for the duration of the user's session at the kiosk.

Figure 2:
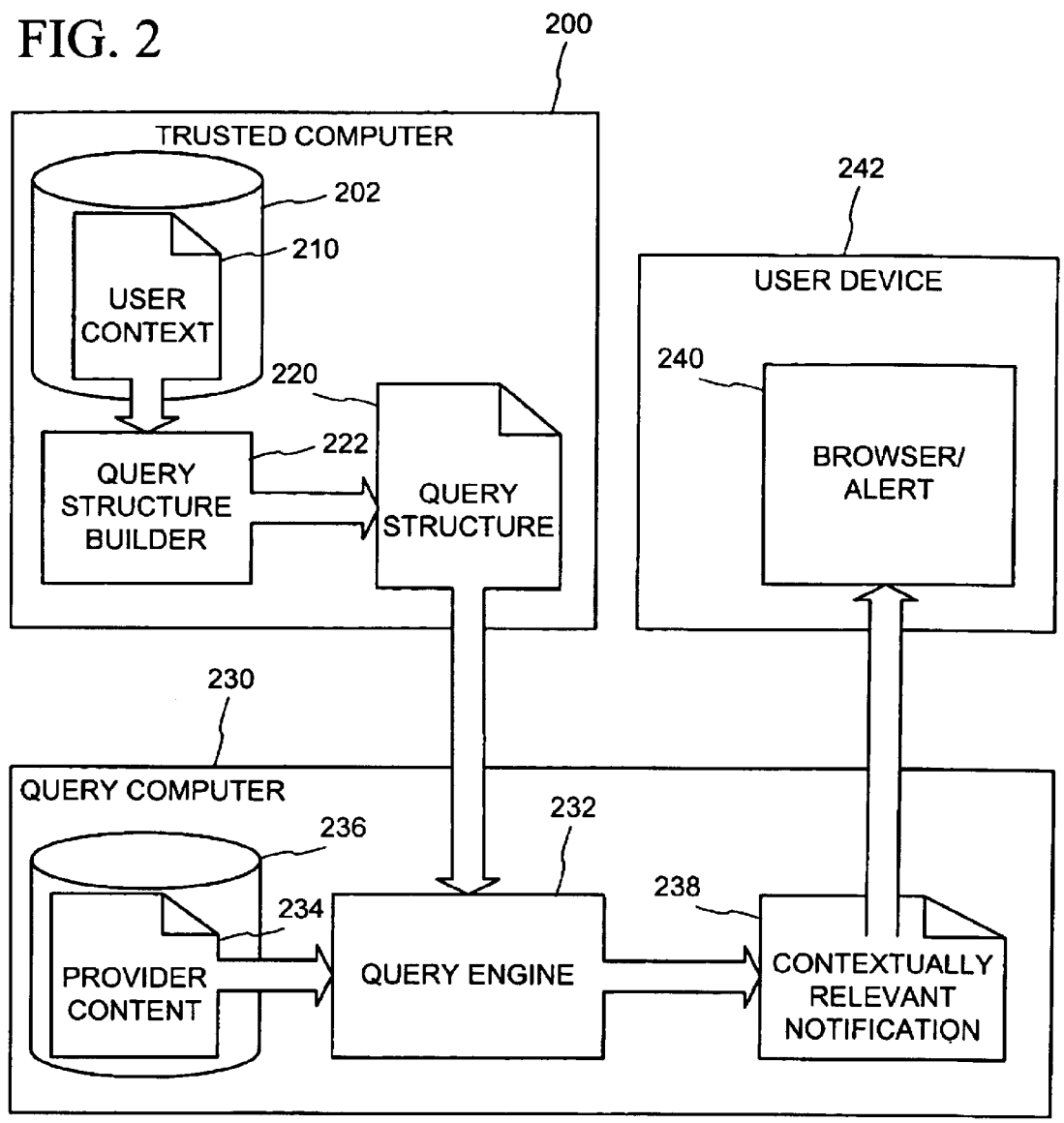
FIG. 2 is a data flow diagram of distributed querying of confidential data within the communication system of FIG. 1.

With reference now to FIG. 2, the illustrated information service 100 (FIG. 1) performs distributed queries at the servers 104–106 for contextually-relevant information (e.g., from the server-side database(s) 112) to communicate to a user at the devices 120–123, 128–129. In this distributed query, the user's confidential data 210 (e.g., data defining the user context) resides in data storage 202 on a trusted computer 200. The trusted computer 200 can be one of the user-operated devices 120–123, 128–129, or alternatively can be one of the servers 104–106 that is operated by an entity (i.e., information service provider) that is trusted by the user to protect the confidentiality of the user context data 210.

The user context data 210 that defines the user's context in the illustrated user-contextual information service 100 can be drawn from a variety of sources. For example, the personal mobile data communications devices 121–123 and/or the data communications networks 110 can be equipped with location detecting capability (e.g., via a Global Positioning System (GPS) receiver in the mobile devices or via triangulation or like process based on the signal received from the mobile devices at nearby wireless towers 126–127) that provides geographic coordinates of the user. Alternatively, the user may directly input location information via speech or text entry, or scanning a bar-code or other machine-readable indicia. As a further example, the user context data 210 can be drawn from the user's calendar, task lists, and contacts, such as may be kept in the user's personal information manager program or on an on-line (e.g., Internet-based) service. As another example, the user context data 210 can include customer/client information from the user's customer relationship management software; project information from project management software; and financial information from personal financial management software, among many other sources of information defining the user's context.

For use by the information service to perform the distributed query, a query structure builder 222 on the trusted computer 200 constructs a contextual relevancy query data structure 220 from the user context data 210. This query data structure 220 operates as a "software black box" that answers the relevancy query as to information possessed by the distributed computers, without revealing the data or logic that went into constructing that answer on the trusted computer. As described in more detail below, the query data structure 220 encapsulates responses to queries on the confidential user context data, but does not include the user context data itself.

The query data structure 220 is distributed to a query processing computer 230 where it is processed to generate contextually relevant information for the user. The query processing computer 230 generally is one of the information service's servers 104–106. Since the query data structure 220 encapsulates query responses and not the confidential user context data itself, the query processing computer 230 can be a server operated by a trusted information service provider, or one operated by another party not having a direct trust relationship with the user. In any case, the query processing computer 230 is able to query the confidential user context data using only the query data structure 220, without having access to the user context data itself.

A contextual query engine 232 in the query processing computer 230 uses the query data structure 220 to answer queries as to the contextual relevancy of the provider's information content 234 to the user. Based on the answer that the contextual query engine obtains from the query data structure 220, the contextual query engine generates and delivers appropriate contextually relevant notifications 238 to the user, such as via an electronic message sent to a browser or alert software 240 on the user's device 120–123, 128–129 (which may be either the trusted computer 200 or a separate user computer 242 if the trusted computer is a server of a trusted information service provider). In particular, the contextual query engine 232 determines from the answer what, whether, when and/or how the information service delivers contextually relevant notifications generated from the provider's content to the user. In some implementations of the contextual information service, the provider content need not reside on the query computer 230. The contextual query engine 232 may instead use context data or other metadata associated with the provider content (whether stored in data storage 236 at the query processing computer 230 or transmitted from another computer (e.g., another of the server computers 104–106) to formulate the queries using the query data structure 220. Further, the contextually relevant notification 238 can be sourced from another computer (e.g., another of the server computers 104–106), such as by providing a link or reference to the browser/alert software for retrieving the contextually relevant notification from such other computer.

Figure 3:
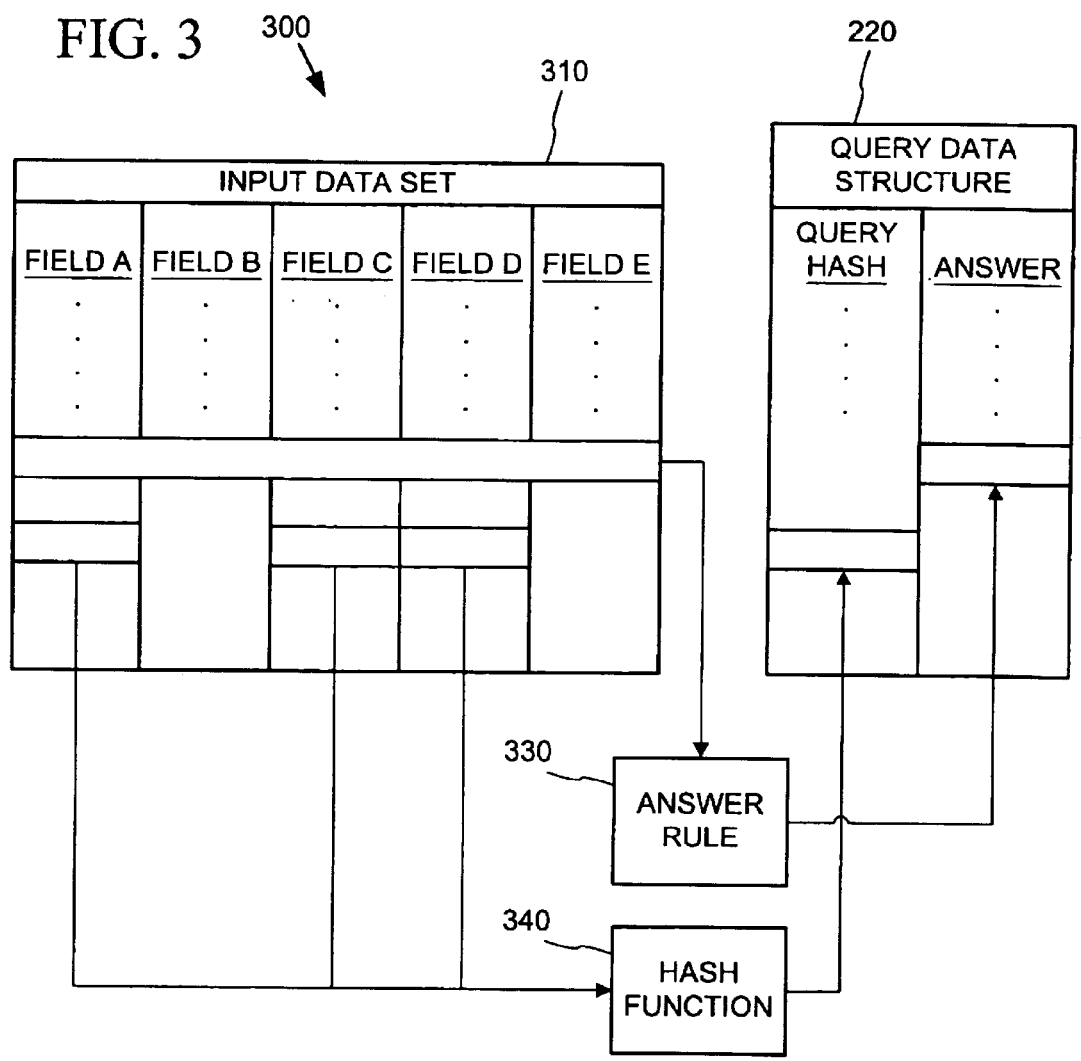
FIG. 3 is a block diagram depicting a distributed confidential query data structure in the distributed querying of FIG. 2.

With reference now to FIG. 3, the query data structure 220 takes the form of a set of query hash and answer pairs, which is constructed from an input data set 310 that represents the user context data 210 (FIG. 2). For ease of illustration, the input data set 310 is illustrated conceptually in FIG. 3 as a flat database table in row/colum format (i.e., where columns represent fields of the input data, such as contact name, calendar date/time, location, etc.), but other arrangements of the user context data alternatively can be used, such as a relational database or other format appropriate to the content of the user context data.

The query hash and answer pairs define answers for a given set of queries on the user context data. For example, the answer can be a simple Boolean value indicating that a combination of input values is or is not relevant to the user's context. More preferably, the answer can be a value indicating an action to be taken with respect to items associated with the combination of input values in the query, such as send an email notification to the user for provider content information relating to a particular combination of contact name, calendar date/time, and location.

The query hash and answer pairs in the query data structure 220 are produced using an answer rule 330 and a query hash function 340. The illustrated query hash function 330 produces a hash value that is a one-way hashing function of at least some of the input data set fields (e.g., fields A, C and D for the illustrated hash function). The resulting query hash value represents a query that is a combination of the values in these fields. Since a one-way hashing function is used for the query hash function in the illustrated user contextual information service 100, the input data set field values cannot be directly recovered from applying a reverse function to the query hash values.

According to one suitable query hash function, unique large prime numbers are assigned to each unique value (i.e., primitive terms) of the input data set fields being hashed. The hash function calculates the product of the primitive terms. Since factoring products of large prime numbers is computationally difficult, this hash function provides a one-way hash of the respective input data set fields.

On the other hand, the answer rule 330 produces an answer value as a function of some or all of the input data set fields (e.g., fields A–E for the illustrated rule). The answer rule effectively represents the logic or reasoning that produces the answer to the corresponding query for a combination of value of the input data set fields (e.g., for a row in the input data set). Accordingly, the query hash and answer pair encapsulate a query involving a combination of input values on the confidential input data set, together with its answer.

The query hash function preferably is a function of a subset of the fields on which the answer rule is based, but the query hash function can be based on fewer, the same, more and/or different of the input data set fields than the answer rule. Where the query hash function is based on fewer or different fields of the input data set than the answer rule, the query data structure prevents discovery of data in fields included in the answer rule but not the query hash function even if it were possible to reverse the query hash function.

The illustrated user-contextual information service 100 preferably facilitates definition of the answer rule by the user by providing a "rules wizard" utility. This utility is a software program that solicits user selection of various options to define the answer rule through a sequence of user input dialog boxes. Alternatively, other forms of user assistance tools can be provided, such as HTML forms with fill-in fields to solicit the user input defining the answer rule.

Figure 4:
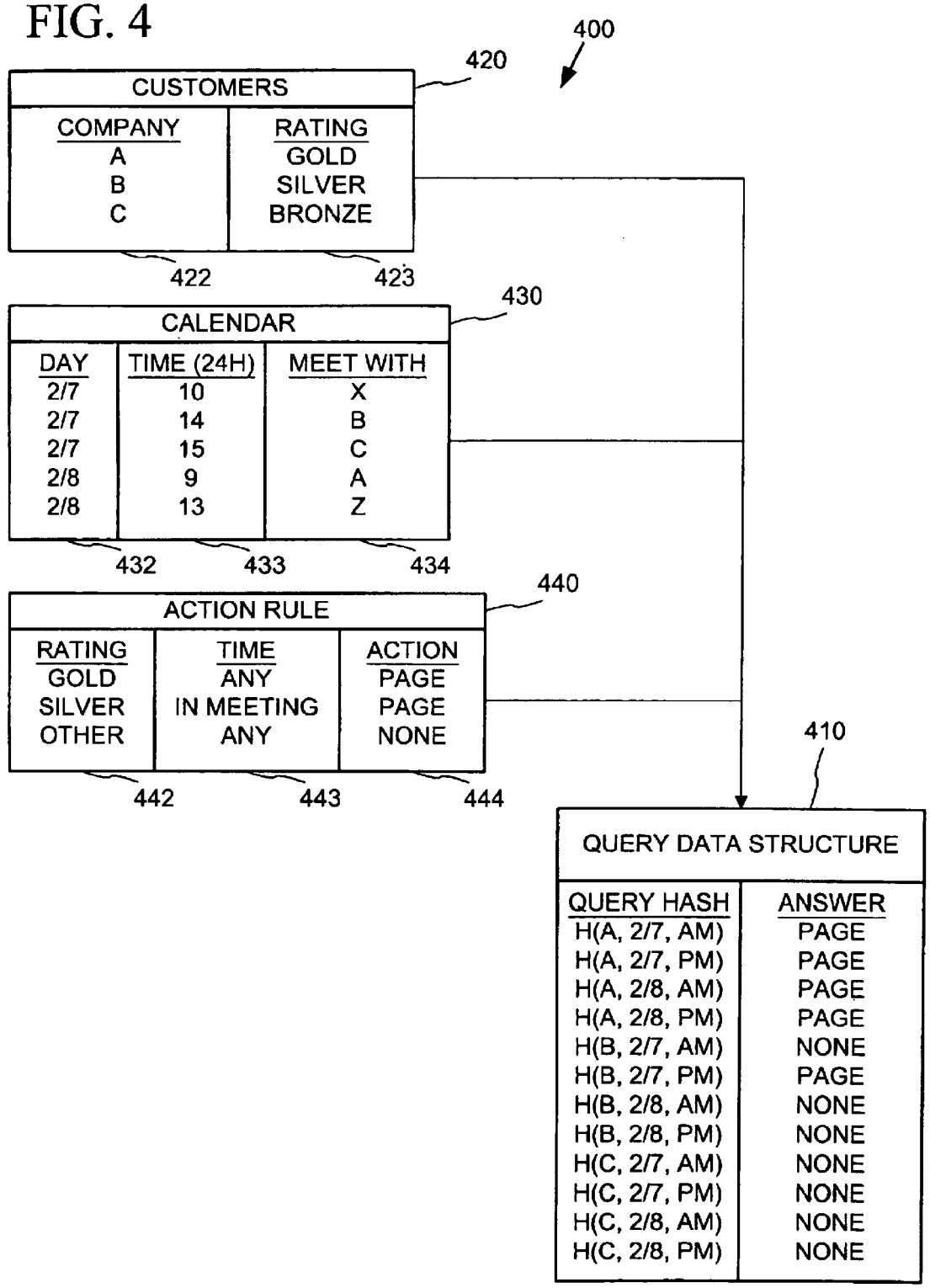
FIG. 4 is a block diagram illustrating an example query data structure for distributed querying in the communications system of FIG. 1.

FIG. 4 illustrates a simple example of constructing a query data structure 410 for confidential distributed querying in the user contextual information service 100 of FIG. 1. In this example, the user has established a contextual relevancy rule for the user-contextual information service 100 that specifies the user is to be paged if the service has news about one of the user's "gold" rating customers, and also if there's news about one of the user's "silver" customers provided the user has meeting with that customer. However, no page is to be provided for the user's "bronze"-rated customers. In this example, the user would be expected to consider the customer identities and ratings, the user's meeting schedule, and the logic of the user's contextual relevancy rule to be highly confidential. The following exemplary query data structure 410 facilitates distributed querying to provide the desired contextual news service, while protecting the user's confidential information.

In this simple example, the user's context data is stored on the trusted computer 200 (FIG. 2) as a customers table 420, a calendar table 430, and an action rule table 440. The customers table 420 stores the identity (i.e., in the company field 422) and a user-assigned rating (the rating field 423) for each of the user's customers. The calendar table 430 includes day, time, and "meet with" fields 432–434 that store the user's calendar. The action rule table 440 summarizes the user's contextual relevancy rule in rating, time and action fields 442–444 (i.e., that a page is to be sent any time news about gold-rated customers is available, that a page is to be sent when news is available about silver-rated customers with whom the customer is meeting, and otherwise no action is to be taken).

Based on this information, the trusted computer produces the illustrated query data structure 410 with query hash, answer pairs for each possible combination of data from the input tables 420, 430 and 440. In particular, a query hash is generated for each of the user's customers and each date/time period represented in the input tables, together with an appropriate answer based on the user-defined contextual relevancy rule. For purposes of illustration, the query hash value in the query data structure 410 is shown using the notation H(company, day, time), indicating a hash function of the company name, day and time. Accordingly, the query hash value for each combination involving a gold-rated customer (e.g., company A in the example) is associated with the answer, "page." The query hash value for the combination involving the silver-rated customer and the user's scheduled meeting time with that customer (e.g., H(B, 2/7, PM)) also is associated with the answer, "page." The query hash value for all other combinations is associated with the answer, "none."

This example query data structure 410 can then be distributed to another computer (the query computer 230 of FIG. 2), which uses the query data structure to answer queries based on the user's confidential information without having access to that information. In this example, the query computer performs a query on the query data structure to determine whether to page the user with a notification about a news release. The query computer calculates the same query hash function of input data field values for the news release. For example, the query computer calculates the query hash value, H(A, 2/7, AM), for a news release about company A on the morning of February 7th. The query computer looks up the answer associated with this resulting hash value in the query data structure 410, and finds that a page is to be sent to the user for this news release. For a further example, when a news release about company B is made available on the afternoon of February $8^{th}$, the query computer calculates and looks up the hash value (H(B, ⅔, PM)) and finds that no action is to be taken.

Accordingly, in this example, the query computer is able to perform this simple distributed contextual relevancy query without having access to any of the user's confidential data in the input tables 420, 430 and 440. The query computer simply determines that a page is to be sent for a news release relating to some particular combination of input values. The data as to the user's confidential information (i.e., customer identities and ratings, the user's meeting schedule, and the logic of the user's contextual relevancy rule) remains at the trusted computer and inaccessible to the query computer.

In the example, the query answer is a simple Boolean value indicating to page or not page the user. For more complex queries, the answer can specify any of multiple values, so as to indicate various alternative actions to take as a result of the query. For example, the answer in a more complex query can specify to send an email at one address, voice mail to a particular voice mail box, among many others.

Further, the distributed querying of the invention can make use of hierarchically structured data to permit constructing broader or narrower queries using the query data structure 410, if the initial query by the query computer fails. For example, the company name field 422 can utilize hierarchically structured data to represent the organizational relationship of companies. Consider, as an example, a situation where a certain holding company W has as subsidiaries the company A, together with companies E and F. When news is released about company W on ⅔ AM, the query computer queries the example query data structure 410 using the hash value, H(W, ⅔, AM), and is unable to find an entry for that hash value in the query data structure. Based on the hierarchically structured data relating company W to companies A, E and F, the query computer repeats the query on the example query data structure 410 using hashes for the subsidiary company names (i.e., H(A, ⅔, AM), H(E, ⅔, AM) and H(F, ⅔, AM)).

The query computer applies rules (which can be specified by the user or determined by the information service) to determine how to handle queries on the hierarchically structured data. Some examples include, (A) performing a same action for a parent company as specified in the answer for a subsidiary; (B) performing a next higher level of action for the parent than specified in the answer for a subsidiary (where actions are ordered); (C) apply the action for a subsidiary as specified in an answer for the parent company; among others. Applying the first rule in this example, the query computer finds an entry in the query data structure using the hash result for company A, and pages the user as per the associated answer.

Figure 5:
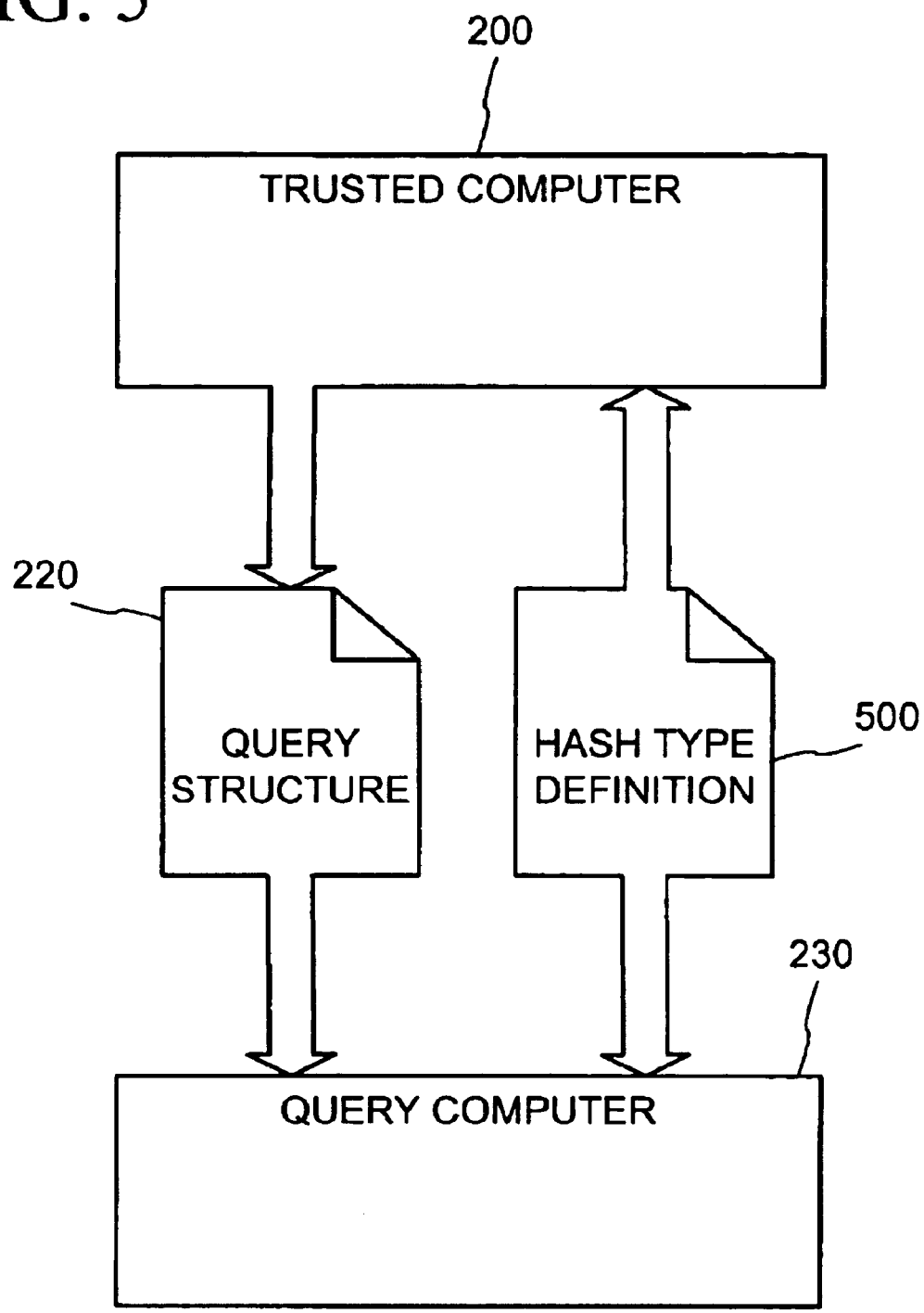
FIG. 5 is a data flow diagram of distributed querying of confidential data within the communication system of FIG. 1.

For distributed querying where the particular combination of terms (e.g., the input fields A, C, and D for the query illustrated in FIG. 3) being queried are known in advance, the input terms of the hash function that are used by the query structure builder 222 (FIG. 2) and query engine 232 (FIG. 2) can be pre-arranged and the hash function is calculated on a non-varying set of input terms. However, for some contextual information services and other applications of the distributed querying, additional flexibility can be obtained by allowing one or the other side of the distributed querying to specify the hash function's input terms, such as by also transmitting a hash type definition 500 between the computers 200, 230 (i.e., from the side that specifies the hash input terms) as shown in FIG. 5. In some distributed querying applications where the user wants to request information related to a particular combination of terms in accordance with a confidential action rule (which may include other terms than the hash function), for example, the trusted computer constructs and transmits the hash type definition 500 to the query computer to specify the user's desired combination of hash input terms. In other distributed querying applications, the information service provider requests that the trusted computer construct the query data structure for a certain combination of input terms to allow the server provider to query on desired input terms.

The hash type definition 500 specifies the input terms of the query hash function as strongly typed data types (i.e., well defined to all parties participating in the distributed query). Suitable data types can include stock symbols, country codes, state codes, zip codes, standard data/time representations, and other widely accepted standards for data representation. The hash type definition 500 can be in the form of a comma delimited list of the data types.

In some distributed querying applications, the information service provider constructs the query data structure for distribution to and querying by the user of the service. This allows querying by the user while protecting the information service's proprietary information.

Although illustrated in its application to a user-contextual information service, the distributed querying according to the invention also can be used to support distributed queries in other applications where it is desired to protect the confidentiality of information possessed by one party or resident on one computer, while allowing other parties from which information or other services are solicited to perform queries on other computers. For example, the distributed querying can support querying by a lender or other party in a transaction of confidential consumer credit report information maintained at a credit reporting agency. As another example, the distributed querying can support queries based on information in confidential health records of hospitals and physicians by insurers, researchers or other parties.

Figure 6:
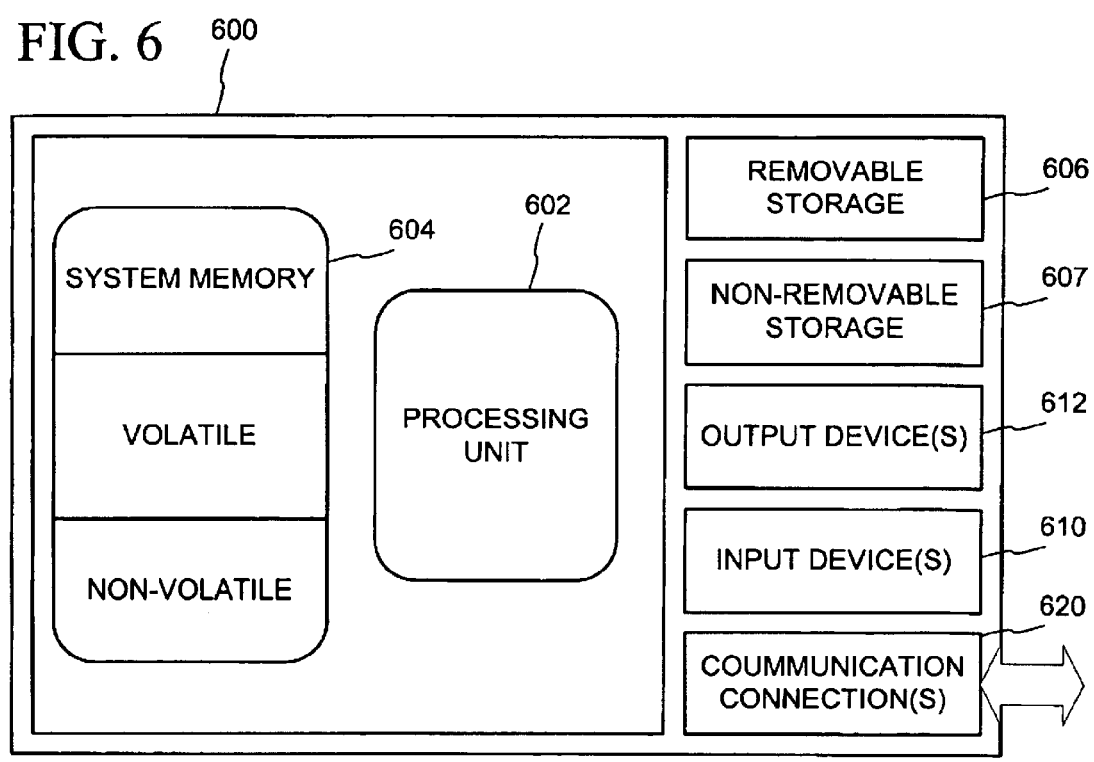
FIG. 6 is a block diagram of a basic configuration of a computer may be used to run the information service of FIG. 1.

With reference to FIG. 6, an exemplary computer 600 in the operating environment 102 (such as used for the servers 104–106, mobile devices 120–123 or stationary devices 128–129) typically is configured to include a processing unit 602 (e.g., a microprocessor or micro-controller) and system memory 604. Depending on the exact configuration and type of computing device, the system memory may be volatile (such as RAM), non-volatile (such as ROM, flash memory, etc.) or some combination of the two. Additionally, the computer 600 may also have mass or secondary storage (removable 606 and/or non-removable 607) such as magnetic or optical disks or tape. Similarly, the computer 600 may also have input devices 610 such as a keyboard, pointing device, microphone, etc., and/or output devices 612 such as display, speaker, printer, force-feedback, etc. The computer 600 also typically includes network connections 620 to other devices, computers, networks, servers, etc. using either wired or wireless media. Alternatively, the system components of a computer may in fact be embodied in a distributed computing system. For example, a terminal device may incorporate input and output devices to present only the user interface, whereas processing component of the system are resident elsewhere. A phone may present web pages that are constructed on a remote server from data resident on a database server somewhere else again.

The various computers (including embedded computing devices) in the operating environment 102 (FIG. 1) typically include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A method supporting distributed querying by a first computer of information residing on a second computer, the method comprising:
    constructing a data set on the second computer to encapsulate querying the information residing on the second computer with queries utilizing a set of query input terms, the data set encoding an answer for each of a plurality of combinations of query input term values, wherein said constructing the data set on the second computer comprises:
        calculating a query hash value as a one-way hashing function of the set of query input terms for each of a plurality of unique combinations of query input term values in the information residing on the second computer;
        for each of the plurality of unique combinations of query input term values, also calculating an answer value as a function of a set of terms in the information residing on the second computer and a logical rule; and
        forming the data set as a plurality of pairs of the query hash value and the answer value for respective of the unique combinations of query input term values;
    transmitting the data set from the second computer to the first computer; and
    evaluating a query having values for the set of query input terms on the first computer using the data set to yield the query's answer.

2. The method of claim 1 wherein said evaluating the query on the first computer comprises:
    calculating an answer look-up index as the one-way hashing function of the query's input term values;
    looking up a query hash value and answer value pair in the data set that is indexed by the answer look-up index; and
    yielding the answer value of the pair as the query's answer.

3. The method of claim 1 further comprising:
    defining the set of query input terms of the query on the first computer in a query definition using strongly-typed data types;
    transmitting the query definition from the first computer to the second computer; and
    constructing the data set on the second computer to encapsulate the queries having query input terms in accordance with the query definition, whereby the second computer provides a data set to the first computer for querying the information with queries having query input terms defined at the first computer.

4. The method of claim 1 further comprising:
    defining the set of query input terms of the query on the second computer in a query definition using strongly-typed data types;
    transmitting the query definition with the data set to the first computer; and
    querying the data set at the first computer using queries having query input terms conforming to the query definition.

5. The method of claim 1 wherein at least one of the query input terms has a hierarchically structured data type, where a first value of said hierarchically structured query input term is hierarchically related to at least one other value, the method comprising:
    if evaluating a query having said first value of said hierarchically structured query input term yields a null answer, evaluating queries having said at least one other value of said hierarchically structured query input term.

6. A user-contextual information service incorporating the method of claim 1 to assess relevancy to a user context, comprising:
    constructing the data set on the second computer where user context information resides to encapsulate querying contextual relevancy utilizing a set of context terms;
    evaluating a contextual relevancy query using the data set to determine contextual relevancy of information provided by the information service; and
    providing the information by the information service in accordance with the answer yielded from evaluating the contextual relevancy query using the data set.

7. One or more computer-readable media having computer-executable instructions for performing a method supporting distributed querying by a first computer of information residing on a second computer, the method comprising:

constructing a data set on the second computer to encapsulate querying the information residing on the second computer with queries utilizing a set of query input terms, the data set encoding an answer for each of a plurality of combinations of query input term values, wherein said constructing the data set on the second computer comprises:

calculating a query hash value as a one-way hashing function of the set of query input terms for each of a plurality of unique combinations of query input term values in the information residing on the second computer;

for each of the plurality of unique combinations of query input term values, also calculating an answer value as a function of a set of terms in the information residing on the second computer and a logical rule; and forming the data set as a plurality of pairs of the query hash value and the answer value for respective of the unique combinations of query input term values;

transmitting the data set from the second computer to the first computer; and evaluating a query having values for the set of query input terms on the first computer using the data set to yield the query's answer.

8. The one or more computer-readable media of claim 7 wherein said evaluating the query on the first computer comprises:

calculating an answer look-up index as the one-way hashing function of the query's input term values;

looking up a query hash value and answer value pair in the data set that is indexed by the answer look-up index; and yielding the answer value of the pair as the query's answer.

9. The one or more computer-readable media of claim 7, the method further comprising:

defining the set of query input terms of the query on the first computer in a query definition using strongly-typed data types;

transmitting the query definition from the first computer to the second computer; and constructing the data set on the second computer to encapsulate the queries having query input terms in accordance with the query definition, whereby the second computer provides a data set to the first computer for querying the information with queries having query input terms defined at the first computer.

10. The one or more computer-readable media of claim 7, the method further comprising:

defining the set of query input terms of the query on the second computer in a query definition using strongly-typed data types;

transmitting the query definition with the data set to the first computer; and querying the data set at the first computer using queries having query input terms conforming to the query definition.

11. The one or more computer-readable media of claim 7 wherein at least one of the query input terms has a hierarchically structured data type, where a first value of said hierarchically structured query input term is hierarchically related to at least one other value, the method comprising:

if evaluating a query having said first value of said hierarchically structured query input term yields a null answer, evaluating queries having said at least one other value of said hierarchically structured query input term.

12. An apparatus supporting distributed querying by a first computer of information residing on a second computer, the apparatus comprising:

means for constructing a data set on the second computer to encapsulate querying the information residing on the second computer with queries utilizing a set of query input terms, the data set encoding an answer for each of a plurality of combinations of query input term values, wherein said constructing the data set on the second computer comprises:

means for calculating a query hash value as a one-way hashing function of the set of query input terms for each of a plurality of unique combinations of query input term values in the information residing on the second computer;

for each of the plurality of unique combinations of query input term values, means for also calculating an answer value as a function of a set of terms in the information residing on the second computer and a logical rule; and means for forming the data set as a plurality of pairs of the query hash value and the answer value for respective of the unique combinations of query input term values;

means for transmitting the data set from the second computer to the first computer; and means for evaluating a query having values for the set of query input terms on the first computer using the data set to yield the query's answer.

13. The apparatus of claim 12 wherein said means for evaluating the query on the first computer comprises:

means for calculating an answer look-up index as the one-way hashing function of the query's input term values;

means for looking up a query hash value and answer value pair in the data set that is indexed by the answer look-up index; and means for yielding the answer value of the pair as the query's answer.

14. The apparatus of claim 12 further comprising:

means for defining the set of query input terms of the query on the first computer in a query definition using strongly-typed data types;

means for transmitting the query definition from the first computer to the second computer; and means for constructing the data set on the second computer to encapsulate the queries having query input terms in accordance with the query definition, whereby the second computer provides a data set to the first computer for querying the information with queries having query input terms defined at the first computer.

15. The apparatus of claim 12 further comprising:

means for defining the set of query input terms of the query on the second computer in a query definition using strongly-typed data types;

means for transmitting the query definition with the data set to the first computer; and means for querying the data set at the first computer using queries having query input terms conforming to the query definition.

16. The apparatus of claim 12 wherein at least one of the query input terms has a hierarchically structured data type, where a first value of said hierarchically structured query input term is hierarchically related to at least one other value, the apparatus comprising:

if evaluating a query having said first value of said hierarchically structured query input term yields a null answer, means for evaluating queries having said at least one other value of said hierarchically structured query input term.

* * * * *